United States Patent [19]
McIntosh et al.

[11] 3,784,758
[45] Jan. 8, 1974

[54] PULSE RATIO DETECTOR

[75] Inventors: Alexander Charles McIntosh, Redmond; Maurice Irvin Smith, Kirkland, both of Wash.

[73] Assignee: Tel-Tone Corporation, Kirkland, Wash.

[22] Filed: May 27, 1971

[21] Appl. No.: 147,621

Related U.S. Application Data

[62] Division of Ser. No. 867,788, Oct. 20, 1969, Pat. No. 3,636,270.

[52] U.S. Cl. ............... 179/84 VF, 328/28, 328/112, 328/147

[51] Int. Cl. ............ H04b 1/10

[58] Field of Search ............... 179/84 VF, 16 EC; 307/233; 328/28, 134, 138, 140, 141, 112, 147; 329/129, 130

[56] References Cited

UNITED STATES PATENTS

| | | | |
|---|---|---|---|
| 3,609,563 | 9/1971 | Zinn | 307/233 |
| 3,593,156 | 7/1971 | Jordan | 328/28 |
| 3,571,523 | 3/1971 | Herter | 179/84 VF |
| 3,557,319 | 1/1971 | Maurer | 179/84 VF |
| 3,537,001 | 10/1970 | Friend | 328/138 |
| 3,454,720 | 7/1969 | Minchenko | 179/84 VF |
| 3,165,709 | 1/1965 | Blochlinger et al | 328/141 X |

*Primary Examiner*—William C. Cooper
*Assistant Examiner*—Randall P. Myers
*Attorney*—Christensen, O'Connor, Garrison & Havelka

[57] ABSTRACT

A frequency detection system provides a distinct output for each sinusoidal input signal represented by a selected frequency or combination of frequencies appearing on a common transmission line. Included are a frequency detector and a plurality of station selectors. The frequency detector comprises circuitry converting any input signal into a rectangular wave whose frequency and wave shape are related to that of the input signal. The rectangular wave is applied to a pulse ratio detector whose output normally blocks the rectangular wave from the frequency detector's output. When a legitimate sinusoidal input signal is being received, as distinguished from noise, the rectangular wave has a unity ratio of positive-negative pulse widths and the pulse ratio detector is operative to allow the frequency detector to produce a pulse waveform whose pulse width is directly related to the input frequency. Each station selector initiates a reference pulse in synchronism with one of the output pulses from the frequency detector. The pulse waveform and the reference pulse are coupled to a coincidence circuit. The duration of the reference pulse is chosen to correspond with that of the pulse waveform, if an input signal having a frequency corresponding to that established for the particular station selector is being received. If the termination of the reference pulse and the pulse from the frequency detector coincide within narrow limits, an output signal is provided to station output device and additionally to a lock circuit in the frequency detector which blocks further operation until the input signal has been removed.

3 Claims, 6 Drawing Figures

PULSE RATIO DETECTOR

CROSS-REFERENCE TO RELATED APPLICATION

This application is a division of a copending application entitled "Highly-Selective Frequency Detection System," McIntosh et al., Ser. No. 867,788, Oct. 20, 1969, now U. S. Pat. No. 3,636,270, issued Jan 18, 1972 which is assigned to the assignee to the present invention.

BACKGROUND OF THE INVENTION

This invention relates to frequency detection systems and, more particularly, a method and apparatus for providing highly selective detection of single or multi-frequency signaling tones such as are used in telephone-associated intercom systems, and condition-responsive control systems.

In communication and control systems wherein data signals are transmitted among a plurality of stations by a single transmission line, it has long been a problem to adequately provide selective signal detection. In many systems, differing bits of data are signified by distinct single-frequency signals. In other systems, simultaneous combinations of single-frequency signals are used for each data bit in which the difference frequency thereof may be readily detected.

Perhaps the most commonly-used application of such systems is in conjunction with telephonic intercommunications. Specifically, there has recently come into widespread use the twin-tone calling system for telephones in which each different multi-frequency tone signal denotes a distinct decimal number. By providing a suitable sequential combination of these twin-tone signals, the user of one telephone unit may address or call any other telephone unit which is connected to the same transmission line or interconnected thereto by suitable switching networks. The twin-tone systems have many advantages over the previously used dial pulse systems, including speed and reliability of operation. However, because of the large quantity of dial pulse systems in existence, the twin-tone systems must generally be compatible therewith. That is, very often a twin-tone system must be used in conjunction with a dial pulse system.

A particular example of such a compatible usage is in the telephone-associated intercoms in which a common transmission line is available for interconnection between the various telephone units at a single geographical location. These intercom systems are in addition to existing telephone equipment which normally provides for access to telephone units at diverse geographical locations through the commercially available telephone network. In these prior telephone-associated intercom systems, each telephone unit was provided with a button-operated intercom switch giving access to the common transmission line and was given a distinct decimal calling number. A dial selector switch, which comprised a simple stepping mechanism, was also connected to this transmission line and included a separate output for each telephone unit. Each output generally included a pair of contacts which, when actuated, operated a buzzer or bell in the telephone unit being called. A person at one telephone unit could address or call another telephone unit on the intercom by pressing his intercom button, then using the dial mechanism associated with the telephone unit to dial the distinct decimal calling number of the other unit. The pulses produced by rotation of the dial at the calling unit were counted by the dial selector switch and the appropriate pair of contacts were closed momentarily to energize the desired buzzer or bell. The party who was being called could then converse with the calling party by depressing his intercom button.

When a twin-tone system was used in conjunction with a dial pulse system, there was simply no convenient way for a party having a dial pulse telephone unit to address a party having a twin-tone unit by the intercom system. Moreover, dial selector switches were insensitive to twin-tone signals so that existing intercom equipment could not be used with telephone systems including only twin-tone units. One response in the prior art has been to make the dial selector switches sensitive to twin-tone signals by including a frequency detection system comprising a plurality of LC circuits which are selective to the individual calling frequencies of the twin-tone signals. Suitable gating means are used to provide appropriate output signals upon detection of the desired calling combinations. These output signals operate relays which cause the dial selector switch to pulse in a manner identical to that when the pulses from a dial pulse unit are being received. This approach requires additional equipment to that needed for dial pulse systems, and with the increase in equipment comes an increase in cost, and a decrease in reliability. Most important, these frequency selective networks do not furnish desired selectivity between different calling signals and are particularly sensitive to noise generated by the operation of any dial pulse equipment connected to the common transmission line.

This approach to the utilization of twin-tone signals leaves much to be desired, especially as twin-tone signals are capable of high selectivity by virtue of the precisely defined difference component thereof used to indicate a data bit. If suitable frequency detection equipment could be devised, the large data-handling capability of twin-tone signals can be used in applications ranging from the simple calling functions of telephone-associated intercoms to the complex codings required in event-monitoring and supervisory systems and other systems involving the transfer of large amounts of data.

It is therefore an object of this invention to provide a frequency detection system which is capable of high selectivity in detecting multi-frequency or narrow-bandwidth single-frequency tone signals.

It is a further object of this invention to provide such a frequency detection system which is relatively insensitive to noise.

It is yet a further object of this invention to provide a frequency detection system which can be used with a telephone-associated intercom and which is compatible with the dial pulse units heretofore used.

SUMMARY OF THE INVENTION

Briefly, a pulse ratio detector constructed according to the teachings of this invention comprises means to detect the presence of a sinusoidal signalling frequency on a transmission line which has a plurality of frequencies thereon. Included is a generator means producing a rectangular waveform from the signals on the transmission line. A switching means has a first input terminal, a second input terminal and an output terminal, and is operative to provide a signal on the output terminal only when the signals presented to the first and the second input terminals have equal magnitudes. A standard signal source is connected to the second input terminal. Means are connected to the generator means for integrating the rectangular waveform and applying the resultant integrated signal to the first input terminal. The time constant of the integrating means is chosen so that the magnitude of the integrated signal equals that of the standard signal only when the rectangular waveform has equal alternate pulse durations.

DESCRIPTION OF THE DRAWINGS

The invention is particularly pointed out and distinctly claimed in the concluding portion of the specification. For a complete understanding of the invention, together with further objects and advantages thereof, reference should be made to the following specification taken in conjunction with the accompanying drawings in which:

DESCRIPTION OF A PREFERRED EMBODIMENT:

Although this invention will be described primarily in the context of a telephone-associated intercom, it is to be understood that the invention is in no way limited to such an application. Rather, the telephone-associated intercom provides but a convenient vehicle for discussion of the operation and advantages of the frequency detection system. A discussion of numerous applications will be found hereinafter. At this point it is sufficient to note that the invention finds general applicability wherever highly-selective detection of single or multi-frequency tone signals is required.

Figure 1:
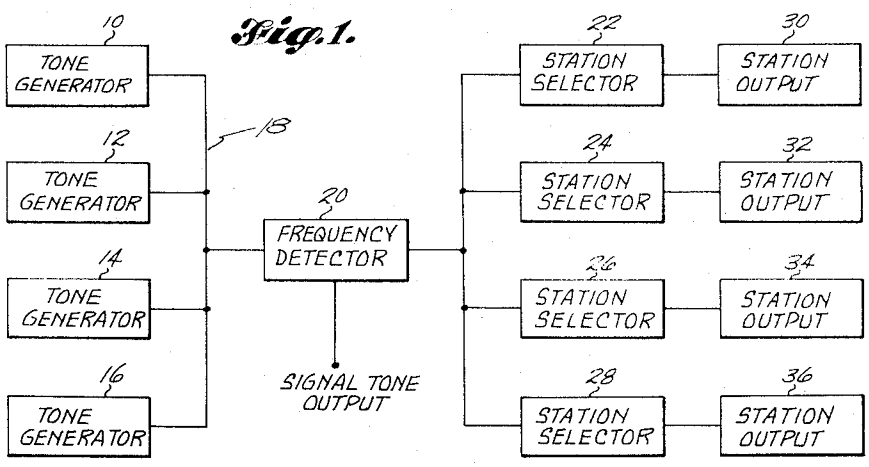
FIG. 1 is a block diagram of the basic components of a frequency detection system in combination with a single transmission line having a plurality of distinct frequency signals thereon.

Now referring to FIG. 1, a plurality of tone generators 10,12,14 and 16 have their outputs connected to a common transmission line 18. Tone generators 10–16 may be physically grouped at one location, or may be at widely-scattered locations. Each tone generator produces a distinct output signal, when actuated, which is characterized by a single frequency or by a combination of frequencies. The presence or absence of each signal indicates two states of an informational quantity. For example, tone generators 10–16 may be associated with a telephone unit wherein each generator's output represents a distinct digit of a calling code. In such a case, an output signal is produced by the appropriate tone generator when the associated push button on the telephone unit is pressed. Transmission line 18 would also have connected thereto the telephone transmitters and the receivers by means of switches located at each telephone unit. In another application, tone generators 10–16 would be actuated upon the occurrence of certain change in a variable quantity which is being monitored. For example, the frequency detection system could be used as part of a supervisory device which records the operations of a commercial twin-tone system. Or, the frequency detection system could be included in an annunciator which provides alarm indications when the process variables in an industrial process reach certain pre-selected values.

Figure 2:
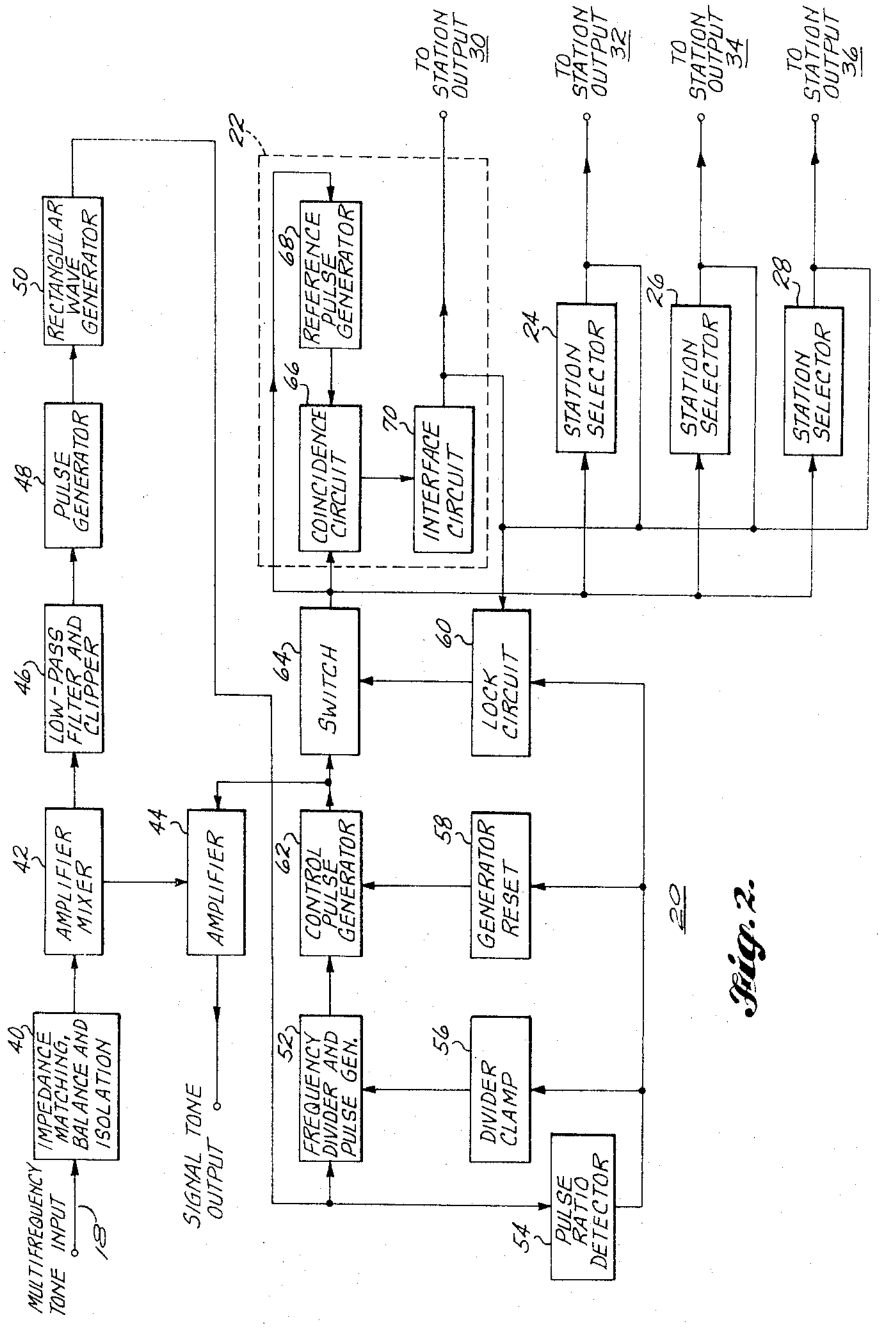
FIG. 2 is a block diagram of the frequency detection system of this invention.
Figure 3:
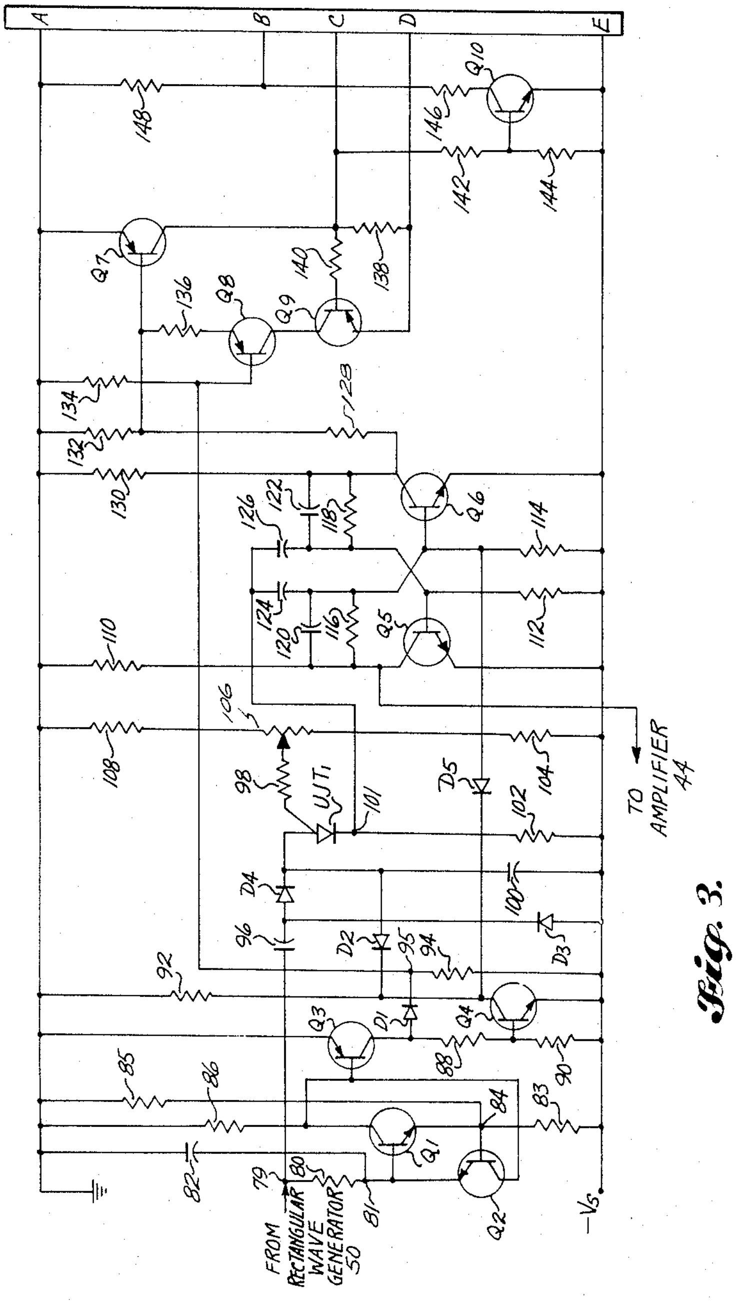
FIG. 3 is a schematic diagram of a portion of the frequency detector illustrated in FIG. 2.

Common transmission line 18 is connected to the input of a frequency detector 20 which forms one portion of the frequency detection system. Frequency detector 20, which will be described in more detail in conjunction with FIGS. 2 and 3, provides a common output signal to a plurality of station selectors 22, 24, 26 and 28. Basically, frequency detector 20 includes means to determine whether or not signals appearing on the common transmission line 18 are legitimate single or multi-frequency tone signals from tone generators 10–16 and in addition converts any legitimate signals so received into a pulse waveform having a repetition rate which is lower than the frequency of the received signal but which is related thereto. The necessity for this frequency conversion will become evident as the operation of the frequency detection system is more fully described.

As can be noted from FIG. 1, a station selector is provided for each tone generator connected to transmission line 18. Thus, station selector 22 may be set to be responsive to the output from tone generator 10, station selector 24 to be responsive to the output from tone generator 12, and so forth. Each station selector is energized when a pulse waveform is produced by frequency detector 20 to develop from this pulse waveform a reference pulse having a certain fixed time duration. Since the repetition rate of the pulse waveform is related to the frequency of the input tone signal, the time duration or width of each pulse accordingly varies with changes in the input frequency. That is, when an input signal is provided by tone generator 10, the pulses produced by frequency detector 20 have a certain duration. When an input signal is provided by tone generator 12, the pulses from frequency detector 20 have a different duration. The reference pulses developed by each of the station selectors 22–28 are chosen to have a time duration which corresponds to the time duration of the pulses from frequency detector 20, when the desired tone signal is being received.

Each station selector then compares its reference pulse with the pulse waveform. If coincidence is detected by a station selector between the termination of its reference pulse and a change in state of the pulse waveform, an output signal is provided therefrom. By simply varying the duration of the reference pulses developed by station selectors 22–28 from the pulse waveform, practically any signal tone frequency can be selected.

Station selectors 20–28 have their outputs connected to a plurality of station output circuits 30,32,34 and 36. When a particular signal tone is detected, the corresponding station selector provides an output signal to the corresponding station output device. In the example of a telephone-associated intercom, each station output device 30-36 may comprise a bell or buzzer. In the case of a monitoring or supervisory system, each of station output devices 30–36 may comprise an event recorder, an indicating lamp, a digital or analog meter, or a computer device.

Since the signal tones generally have a frequency in the audible range, a separate signal tone output may be provided from frequency detector 20 which can be suitably amplified and supplied to a loud speaker to thereby furnish a distinctive, audible indication of the particular signal tone being received. Such an output is particularly useful in intercom systems wherein a plurality of telephone units may be grouped at a single location.

Referring now to FIG. 2, an embodiment of the frequency detection system useful in telephone-associated intercoms having multi-frequency signaling tones is illustrated. The multi-frequency signal tones are produced by a plurality of tone generators, not illustrated, which may be actuated by the push buttons in a telephone unit. Commonly, there are ten push buttons, one for each digit of a decimal code. In certain applications, additional buttons and tone generators may be provided for additional signaling functions. Whatever the number of multi-frequency tones that are generated, there is produced a plurality of signals, wherein the difference frequency of each signal indicates a single digit.

The function of elements 40–50 in FIG. 2 is to extract this difference frequency component and to convert it into a rectangular waveform suitable for conversion into the pulse waveform output of frequency detector 20 previously mentioned. To this end the multi-frequency signal tone and other signals appearing on line 18 are applied first to an impedance matching, balance and isolation circuit 40. Included therein are a high impedance bridge across the transmission line and circuitry common in the art to match the frequency detector 20 input impedance to the impedance of line 18, to maintain any line balance, and to isolate the frequency detector 20 from high-voltage transients on the transmission line, such as those caused by dial pulse equipment.

The output of circuit 40 is connected to a circuit 42 whose function is to amplify the weak input signals and to mix the distinct frequencies of the multi-frequency signal tone so that the predominant component of the output signal therefrom is at the diference frequency of the signal tone. Circuit 42 may comprise two transistors having their collectors connected in parallel which are designed to operate in a class B mode.

The output of amplifier and mixer circuit 42 is connected to an amplifier 44 and to a low-pass filter and clipper circuit 46. Amplifier 44 also has a modulation input which has connected thereto the pulse waveform that appears at the output of frequency detector 20 and provides the signal tone output when frequency detector 20 is supplied with a legitimate multi-frequency signal tone. The operation and construction of amplifier 44 will be discussed in more detail hereinafter.

The function of low-pass filter and clipper circuit 46 is to select the difference frequency component of the composite output from circuit 42. To this end, circuit 46 may include an RC filter and transistor amplifier reducing the high-frequency components present in the composite signal. The output signal from circuit 46 is a ragged sawtooth having a periodicity equal to the frequency of the difference component.

A pulse generator 48 is driven by the output from circuit 46 to convert this sawtooth into a series of sharp, synchronizing pulses. Accordingly, pulse generator 48 includes any bi-stable device which provides a waveform with a square leading edge. The repetition rate of this waveform is equal to the difference frequency.

The output of pulse generator 48 is connected to a rectangular wave generator 50 which may comprise any bi-stable switch which generator 50 divides the repetition rate of the waveform from pulse generator 48 in half and produces at its output a rectangular waveform having a frequency equal to one-half the frequency of the difference component.

If a legitimate multi-frequency signal tone is being received which is a combination of two sinusoidal waveforms, the waveform produced by generator 50 is a square wave whose ratio of positive to negative pulse durations is unity. In the case of noise or other random input frequencies which produce a signal from pulse generator 48, the waveform from generator 50 is a rectangular wave whose ratio of positive to negative pulse durations is not unity. Rather, the waveform has random excursions between positive and negative pulses. This distinction between the waveform outputs of generator 50 that are produced by legitimate and non-legitimate signal tones is used by the succeeding circuitry of the frequency detector 20 to distinguish therebetween.

Specifically, the output of generator 50 is supplied to both a frequency divider and pulse generator 52 and to a pulse ratio detector 54. The function of pulse ratio detector 54 is to inhibit any further operation of the frequency detector 20 unless a legitimate multi-frequency signal is being received thereby. As mentioned previously, the output of generator 50 will be a square wave having a unity ratio between positive and negative pulse durations when such a legitimate signal is being received. Accordingly, pulse ratio detector 54 must be operative to sense this unity ratio and provide an appropriate output signal in response thereto. Pulse ratio detector 54 is preferably constructed according to the teachings of this invention, as illustrated in FIG. 3, and described in more detail later in this specification.

The output of pulse ratio detector 54 is connected to a divider clamp circuit 56, a generator reset circuit 58, and a lock circuit 60. Divider clamp circuit is associated with circuit 52, generator reset circuit 58 with a control pulse generator 62, and lock circuit 60 with a switch 64. In operation, when a legitimate multi-frequency tone input signal is not being received by the frequency detector, the output of pulse ratio detector 54 maintains frequency divider and pulse generator circuit 52 in a clamped or inoperative condition through divider clamp circuit 56 and in addition maintains control pulse generator 62 in a reset condition through generator reset circuit 58. When a legitimate multi-frequency signal input is being received, the output of pulse ratio detector 54 releases circuit 52 through clamp circuit 56.

Circuit 52 is essentially a counter which provides one output pulse for a predetermined number of input pulses thereto. The actual division factor used is unimportant, it being necessary only to provide from the square waveform produced by generator 50 a pulse waveform whose repetition rate is compatible with the duration of the reference pulses developed in each of the station selector circuits 22–28. For example, circuit 52 may comprise a simple divide-by-ten or decimal counter which counts only when an output signal denoting the reception of a legitimate multi-frequency signal input is produced by pulse ratio detector 54, and which is automatically reset upon cessation of that output.

The output of circuit 52 is connected to control pulse generator 62 which may comprise a bi-stable switch producing a square wave output whose frequency is one-half the repetition rate of the pulses from circuit 52. By virtue of generator reset circuit 58, the first pulse produced by control pulse generator 62 is always of the same polarity.

The square wave appearing at the output of generator 62 is essentially the pulse waveform output of frequency detector 20 and is accordingly supplied as a modulating input to amplifier 44. In the embodiment illustrated in FIG. 2, this pulse waveform is passed through an additional switch 64 which performs a locking or holding function to be hereinafter described. This locking function is directly under control of lock circuit 60 which has as its inputs the aforementioned output from pulse ratio detector 54 and any of the outputs provided by station selectors 22–28. When lock circuit 60 is not actuated, switch 64 operates in step with the control pulse generator 62 so that the pulse waveform at the output of generator 62 also appears at the output of switch 64.

The output of switch 64 is supplied to each of the station selector circuits 22-28. It should be remembered that the presence of this output waveform indicates that a legitimate multi-frequency signal has been received, and the duration of each pulse in the waveform is directly related to the difference frequency component of the multi-frequency signal tone.

In FIG. 2, only the station selector 22 is shown in detail and it is to be understood that the remaining station selectors 24–28 are identical thereto. The output from switch 64 is applied to a first input of a coincidence circuit 66 and to a reference pulse generator 68. Reference pulse generator 68 is normally in a reset condition, but is triggered to initiate a reference pulse upon the occurrence of the leading edge of the first output pulse from switch 64. Starting at the leading edge of the first pulse is not critical to the operation of the frequency detection system but does not allow a fast response to any multi-frequency signal tone. What is critical is that the operation of the reference pulse generator 68 be synchronized with the changes in state of the pulse waveform produced by the frequency detector 20. Providing frequency selection by deriving a reference pulse from the multi-frequency signal tone is especially important when slight variations in the difference frequency occur, for those variations will also be reflected in the timing of the reference pulse.

After the initiation of its operation, reference pulse generator 68 continues to provide a reference pulse for a predetermined time interval, which may be established by a simple RC circuit. The time constant of this circuit must be variable so that the duration or width of the reference pulse can be varied.

The reference pulse is coupled to a second input of coincidence circuit 66, which is operative to provide an output pulse to an interface circuit 70 only when the termination of the reference pulse from generator 68 and the next change in state of switch 64 coincide, within a narrow time slot. It is quite evident, then, that the time constant of reference pulse generator 68 may be varied to select almost any multi-frequency signal tone, as the periodicity or duration of the switch 64 output pulses vary in direct relation to the difference frequency component. Upon the occurrence of the output from coincidence circuit 66, interface circuit 70 is actuated to provide an output signal to the corresponding station output device 30. In a simple embodiment, interface circuit 70 may comprise a relay whose contacts are closed upon the occurrence of a coincidence.

The output from interface circuit 70 is also connected to lock circuit 60. Briefly, lock circuit 60 is placed in a ready condition upon the detection of a legitimate multi-frequency signal input, as represented by the output from pulse ratio detector 54. When a particular station selector signifies that the multi-frequency signal tone corresponds to its preset frequency, the output from the particular interface circuit 70 allows lock circuit 60 to provide a signal to switch 64 to lock that switch in its present state. It is desirable that the timing of this operation be chosen so that the lock operation occurs when switch 64 is in the same state in which a coincidence has been detected, so that coincidence circuit 66 continues to provide an output signal through interface circuit 70 to the corresponding station output device. By locking switch 64 in this state, further operation of the frequency detector 20 is blocked although control pulse generator 62 continues to oscillate.

The system illustrated in FIG. 2 continues to provide an output signal under such circumstances until the multi-frequency signal tone is removed from frequency detector 20. At that time, pulse ratio detector 54 returns to its de-energized state, thereby clamping frequency divider and pulse generator circuit 52 in a de-energized state, resetting generator 62 through circuit 58, and disenabling lock circuit 60. Thereafter, the frequency detection system is ready to receiver, detect and select another multi-frequency signal tone.

Figure 4:
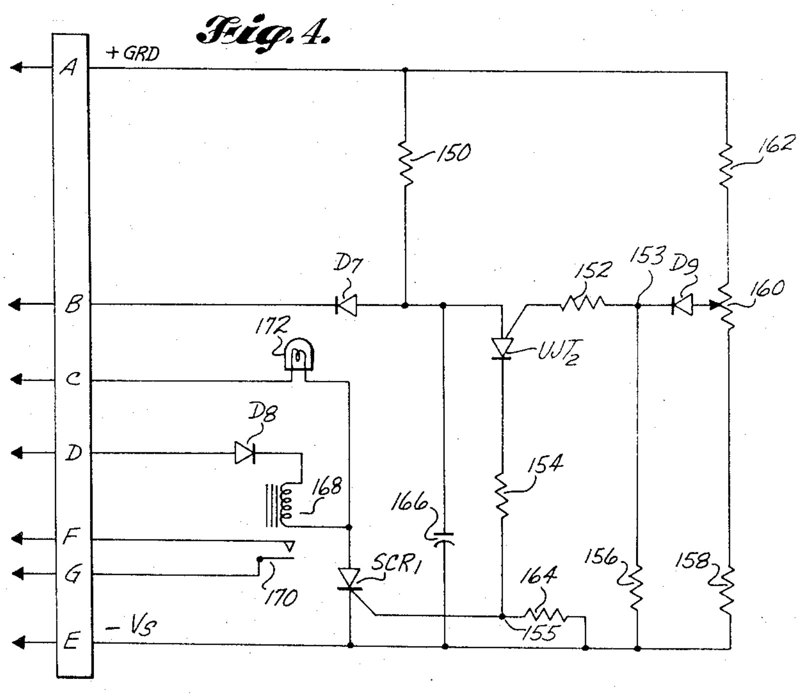
FIG. 4 is a schematic diagram of the station selector illustrated in FIG. 2.

Although the frequency detection system of this invention is in no way to be limited thereto, certain elements illustrated in FIG. 2 are preferably constructed according to the teachings of FIGS. 3 and 4. During the description of these novel circuit elements, reference should also be made to the timing diagram of FIG. 5 for a complete understanding of their operation.

The rectangular waveform from generator 50 is connected to a common junction 79 which serves as the input terminal to frequency divider and pulse generator 52 and to pulse ratio detector 54. As discussed previously, the frequency of this waveform is related to the frequency of the input signal, whether it be a single frequency tone or the difference component of a multi-frequency tone. If a legitimate signal is being received, the waveform from generator 50 is a square wave, with equal positive and negative pulse durations. With random input frequencies, such as noise, the waveform has randomly-varying positive and negative pulse durations.

Common junction 79 is connected to a junction 81 by a resistor 80. Junction 81 is in turn connected to reference potential through a capacitor 82, to the base electrode of a transistor $Q_1$ and to the emitter of a transistor $Q_2$. The emitter of transistor $Q_1$ is connected to a junction 84 which is in turn connected to the base of transistor $Q_2$, to reference potential through a resistor 85, and to a biasing voltage source $-V_s$ through a resistor 83. The collector of transistor $Q_1$ is connected to reference potential by a resistor 86 and to the base of a transistor $Q_3$. The collector of transistor $Q_2$ is also connected to the base of transistor $Q_3$. The emitter of transistor $Q_3$ is connected directly to reference potential, and the collector of transistor $Q_3$ is connected to $-V_s$ by resistors 88 and 90. A transistor $Q_4$ has its base connected to the common junction of resistors 88 and 90, its emitter connected directly to $-V_s$, and its collector to reference potential through a resistor 92.

These components, from input terminal 79 to transistor $Q_4$, form pulse ratio detector 54. The values of resistors 83 and 85 are chosen so that the potential at junction 84 provides a reference voltage which is equal to one-half of the biasing voltage $-V_s$. On the other hand, the values of resistor 80 and capacitor 82 are chosen so that junction 81 has an integrated voltage thereon which is equal to one-half of the biasing voltage $-V_s$ when the input signal on terminal 79 has equal positive and negative pulse durations, or a unity positive-negative time ratio in which there is zero DC current. Such a condition occurs only when a legitimate signal is being received and under other conditions the voltage at junction 81 varies from this value.

When no signal is being received, the voltage on terminal 79 is either positive or negative. If it is negative, transistor $Q_2$ is in a conducting condition to develop a voltage across common collector-resistor 86. If junction 79 is positive, transistor $Q_1$ is in a conducting condition to again develop a voltge across resistor 86. Accordingly, a voltage is present across resistor 86 and thus presented to the base of transistor $Q_3$ at all times, unless both transistors $Q_1$ and $Q_2$ are in a non-conducting condition. When a square wave is present at terminal 79, indicating the reception of a legitimate signal, the equality of voltage at terminals 81 and 84 places both transistors $Q_1$ and $Q_2$ in a non-conducting condition. At this time, transistor $Q_3$ turns off, and, as its collector takes the value of the biasing voltage $-V_s$, transistor $Q_4$ turns off, at which time its collector rises to reference potential. These collector voltage changes of transistors $Q_3$ and $Q_4$ are used to provide an output to circuits 56, 58 and 60 to thereby indicate that a legitimate signal is being received by the frequency detection system.

The signal appearing at terminal 79 is coupled to one terminal of a programmable unijunction transistor $UJT_1$ by a coupling capacitor 96 and a diode $D_4$. Transistor $UJT_1$ forms the basis of frequency divider and pulse generator circuit 52 and may be of a type commercially available from the General Electric Company. Briefly, a programmable unijunction transistor includes an anode, a cathode and a gate, in which the forward breakdown voltage for current flow from the anode to the cathode is determined by the voltage presented to the gate.

The common junction of capacitor 96 and diode $D_4$ is coupled to $-V_s$ by a diode $D_3$. The common junction of diode $D_4$ and $UJT_1$ is coupled to $-V_s$ by a capacitor 100, and to the collector of transistor $Q_4$ by a diode $D_2$. The cathode of $UJT_1$ is coupled to $-V_s$ through a resistor 102. The common point of $UJT_1$ and resistor 102 is an output point 101 which is connected to the input of control pulse generator 62. The gate of $UJT_1$ is connected to the tap of a potentiometer 106 through a resistor 98. One end of potentiometer 106 is connected to reference potential by a resistor 108, and the other end to $-V_s$ by a resistor 104.

Figure 5:
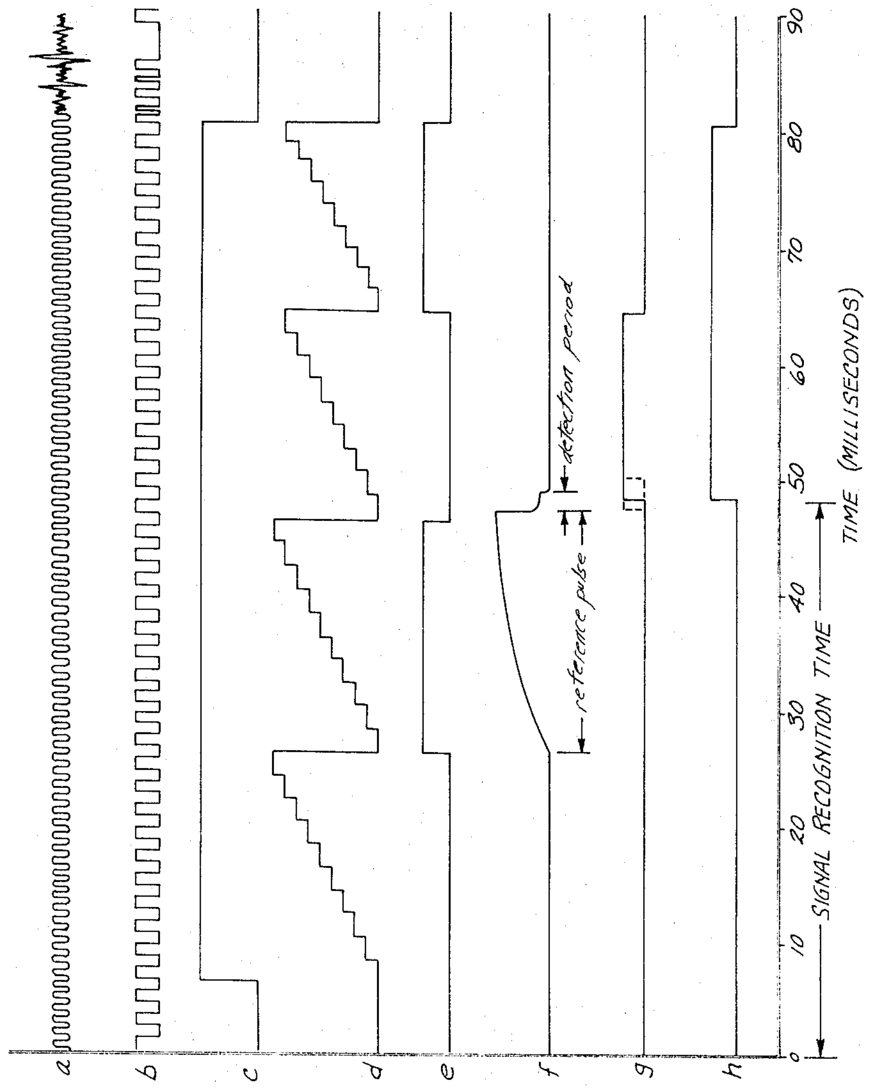
FIG. 5 is a timing diagram illustrating the operation of the frequency detection system.

Referring now to FIG. 5, curve *a* thereof represents a received single-frequency tone, or the difference component of a multi-frequency tone. Curve *b* represents the square waveform which is produced by wave generator 50 when such a legitimate, sinusoidal input is being received. Curve *c* represents the general logic state of pulse ratio detector 54 between OFF and ON conditions. The ON state is present when the aforementioned transistors $Q_3$ and $Q_4$ are placed in a non-conducting condition. Previous to the time when the pulse ratio detector 54 is ON, transistor $Q_4$ is conducting and accordingly diode $D_2$ is forward-biased to shunt the signal appearing on terminal 79 from capacitor 100. When transistor $Q_4$ turns off upon the reception of a legitimate signal, diode $D_2$ becomes reverse-biased to permit the positive portion of the signal appearing at terminal 79 to be stored in capacitor 100. Diode $D_4$ blocks the negative pulses therefrom and prevents capacitor 100 from discharging during the negative half-cycles. Each successive positive pulse appearing at terminal 79 increases the amount of charge stored in capacitor 100, and thus the voltage thereacross, in a step-like fashion. This voltage increase is graphically illustrated by curve *d* of FIG. 5. When a certain, predetermined voltage is reached across capacitor 100, programmable unijunction transistor $UJT_1$ conducts to provide a discharge path for capacitor 100 through resistor 102.

The number of positive pulses or steps required for $UJT_1$ to reach this discharge point is determined by the voltage at the gate thereof, which in turn is established by the setting of the tap on potentiometer 106. For most cases, the number of positive pulses that are required to discharge capacitor 100 will be ten so that the frequency divider and pulse generator 52 functions as a divide-by-ten counter. However, this number is not critical, and in fact the waveforms illustrated in FIG. 5 show circuit 52 to function as a divide-by-eight counter, with one output pulse for every eight cycles of the input waveform thereto.

The discharge of capacitor 100 through $UJT_1$ and resistor 102 produces a voltage pulse at point 101 which is transferred to the drive input of control pulse generator 62 which, in the embodiment of FIG. 3, comprises a standard bi-stable multi-vibrator including transistors $Q_5$ and $Q_6$. The emitters of these transistors are connected directly to $-V_s$, the collector of transistor $Q_5$ to reference potential through a resistor 110, and the collector of transistor $Q_6$ to reference potential through a resistor 130. Point 101 is connected to the base of transistor $Q_6$ through a capacitor 124, and to the base of transistor $Q_5$ through a capacitor 126. Cross-coupling paths between the bases and collectors of transistors $Q_5$ and $Q_6$ are provided by resistors 116 and 118 and by capacitors 120 and 122. The base of transistor $Q_5$ is also connected to $-V_s$ by a resistor 112, and the base of transistor $Q_6$ is connected to $-V_s$ by a resistor 114. A diode $D_5$ couples the base of transistor $Q_6$ to the collector of transistor $Q_4$ in pulse ratio detector 54. The voltage appearing on the collector of transistor $Q_5$ provides the aforesaid modulating input to amplifier 44, and the voltage appearing on the collector of transistor $Q_6$ provides an output to switch 64.

In operation, diode $D_5$ functions as the generator reset circuit 58. When no legitimate signal is being received by the frequency detection system, transistor $Q_4$ is conducting and thus the base of transistor $Q_6$ is connected to $-V_s$ through $Q_4$ and $D_5$, placing $Q_6$ in a non-conducting condition and thus $Q_5$, by virtue of feedback through the cross-coupling paths, in a conducting condition. When the pulse ratio detector 54 changes state, transistor $Q_4$ becomes non-conductive and the reset signal path is opened. Thereafter, the operation of transistors $Q_5$ and $Q_6$ is under control of the pulses appearing at junction 101. With this arrangement, control pulse generator 62 always produces a first output pulse of a given polarity on the reception of a legitimate signal and a corresponding pulse output from circuit 52, as represented by the pulses at point 101. The output appearing at the collector of transistor $Q_6$ is illustrated in curve *e* of FIG. 5 and comprises a square wave whose frequency is one-half the pulse repetition rate of the pulses at point 101. This output also appears at the collector of transistor $Q_5$ but is 180° out of phase. When the $Q_5$ output is applied to amplifier 44, the resultant signal tone output comprises an audible tone of a frequency equal to the received single-frequency or difference component frequency which is switched on and off at a rate determined by the frequency of operation of control pulse generator 62. Such an audible tone provides a distinct signaling indication of the particular station being called.

The detailed operation of control pulse generator 62 including transistors $Q_5$ and $Q_6$ is conventional and need not further be described. The voltage waveform at the collector of transistor $Q_6$ is connected to switch 64 by a voltage divider network including a resistor 128 and 132 connected between the collector of transistor $Q_6$ and reference potential. The common junction of this network is connected to the base of a transistor $Q_7$ whose emitter is connected to reference potential and whose collector is connected to an output point C for frequency detector 20. Because of reset circuit 58, the first output pulse at point 101 always has a polarity such as to place transistor $Q_7$ in a conducting condition. With the next, succeeding change in state of control pulse generator 62, transistor $Q_7$ is normally placed in a non-conducting condition. Thus, the change in output state of transistor $Q_7$ normally follows that of control pulse generator 62.

The voltage waveform appearing at the collector of transistor $Q_7$ is applied to the base of a transistor $Q_{10}$ by a voltage divider network including resistors 142 and 144 connected to $-V_s$. The emitter of transistor $Q_{10}$ is connected directly to $-V_s$, and the collector thereof to reference potential through resistors 146 and 148. Transistor $Q_{10}$ functions to reverse the polarity of the voltage waveform at the collector of $Q_7$, and provides a second output for frequency detector 20 at a point B which is connected to the common junction of resistors 146 and 148. The connections of transistors $Q_7$ and $Q_{10}$ are such that when transistor $Q_7$ is turned off by the first pulse from control pulse generator 62, transistor $Q_{10}$ is likewise placed in a non-conducting condition. Thus, transistors $Q_7$ and $Q_{10}$ function as switch 64.

Now referring especially to FIG. 4, the typical station selector circuit illustrated therein has terminals A, B, C, D and E which are connected to the similarly-marked terminals of frequency detector 20 illustrated in FIG. 3. The station selector additionally has terminals F and G which serve as the output of the interface circuit 70 therein. Terminal B, which is connected to the collector of transistor $Q_{10}$ through resistor 146, is also connected to the anode of a second programmable unijunction transistor $UJT_2$ through a diode $D_7$. The common point between $D_7$ and $UJT_2$ is connected to reference potential by a resistor 150, and to $-V_s$ by a capacitor 166. The gate of $UJT_2$ is connected to reference potential and to $-V_s$ through a voltage divider network which includes a resistor 152 connected between the gate thereof and a common point 153, a resistor 156 connected between point 153 and $-V_s$, a resistor 162, potentiometer 160 and resistor 158 connected in series between reference potential $-V_s$, and a diode $D_9$ connected between point 153 and the tap of potentiometer 160. The cathode of $UJT_2$ is connected to $-V_s$ by a voltage divider including resistors 154 and 164.

The elements including diode $D_7$ and transistor $UJT_2$ function as the reference pulse generator 68 and the output thereof appears at common point 155 between resistors 154 and 164. As with transistor $UJT_1$, the voltage at which transistor $UJT_2$ conducts is controlled by the voltage applied to the gate thereof. This gate voltage may be readily set by adjustment of the tap on potentiometer 160. Normally, $Q_{10}$ is conducting and shunts the current in resistor 150 from capacitor 166 by means of diode $D_7$. When $Q_{10}$ turns off, diode $D_7$ is reverse-biased by the rise in collector voltage appearing at pont B, and the shunt is therefore removed. Capacitor 166 then charges through resistor 150 to produce a ramp waveform at the anode of transistor $UJT_2$. When the ramp waveform reaches a certain, predetermined value, as established by the setting of potentiometer 160, transistor $UJT_2$ conducts to provide a discharge path for capacitor 166 through resistors 154 and 164. This current flow creates a sharply defined voltage pulse at point 155. Since the removal of the shunt from capacitor 166 is always precisely synchronized with the occurrence of the first output pulse from control pulse generator 62, the occurrence of the narrow output pulse from reference pulse generator 68 which appears at point 155 can be precisely related to a desired calling frequency. The timing of this output pulse is controlled by the values of capacitor 166 and resistor 150 and by the setting of the potentiometer 160.

Point 155 is connected to the gate of a silicon-controlled rectifier $SCR_1$ which forms the basic element of coincidence circuit 66. The cathode of $SCR_1$ is connected directly to $-V_s$ and the anode thereof to the collector of transistor $Q_7$ through an indicating lamp 172 and terminal C. The anode of $SCR_1$ serves as the output of coincidence circuit 66 and is connected to interface circuit 70 which may comprise a simple relay including a coil 168 having one end connected to the anode of $SCR_1$ and also including a pair of contacts 170 connected to terminals F and G. The other end of coil 168 is connected to terminal D by a diode $D_8$. Terminal D, in turn, is connected to the collector of transistor $Q_7$ by a resistor 138, and is connected directly to the emitter of a transistor $Q_9$. Terminal C is connected to the base of transistor $Q_9$ by resistor 140. The collector of transistor $Q_9$ is connected to the collector of a transistor $Q_8$ whose emitter is connected to the base of transistor $Q_7$ by a resistor 136 and whose base is connected to reference potential by a resistor 134. Transistors $Q_8$ and $Q_9$ function as the aforesaid lock circuit 60 and accordingly a connection is made from the base of transistor $Q_8$ to pulse ratio detector 54 including a common point 95 between a diode $D_1$ connected to the collector of transistor $Q_3$ and a resistor 94 connected to $-V_s$.

With particular reference now to FIG. 5, curve *f* thereof indicates the ramp waveform applied to the anode of $UJT_2$ by capacitor 166. It is to be noted that the ramp waveform begins at the instant that control pulse generator 62 first produces an output pulse. When the ramp waveform reaches a certain, predetermined value, $UJT_2$ conducts to produce a sharp voltage pulse at point 155. The values of the voltage divider network connected to the gate of $UJT_2$ may be chosen to maintain that transistor in a conducting condition, as indicated in curve *g* of FIG. 5. With the next reversal in state of the output from control pulse generator 62, transistors $Q_7$ and $Q_{10}$ are placed in a conducting condition. The relatively positive voltage thus appearing at the collector of transistor $Q_7$ is coupled through terminals C and D to the anode of $SCR_1$. If the voltage pulse appearing at point 155 coincides with this application of voltage to the anode of $SCR_1$, $SCR_1$ is placed in a conducting condition and is maintained in that state until transistor $Q_7$ is turned off.

The importance of the timing of the voltage pulse occurring at point 155 with respect to frequency selection is now apparent. If that voltage pulse is applied to the gate of $SCR_1$ in advance of the time when the output from control pulse generator 62 reverses state and transistor $Q_7$ turns on, there is not sufficient anode voltage for $SCR_1$ to respond to the gating pulse. If, on the other hand, control pulse generator 62 changes state and turns transistor $Q_7$ on before the voltage pulse from reference pulse generator 68 appears at point 155, transistor $Q_{10}$ turns on to shunt the anode of transistor $UJT_2$ to $-V_s$ by means of diode $D_7$ and resistor 146, and accordingly capacitor 166 is discharged before the breakover voltage of $UJT_2$ can be reached. The state of transistors $Q_7$, $Q_{10}$, $SCR_1$, $Q_8$ and $Q_9$ is indicated in curve *h* of FIG. 5.

When $SCR_1$ conducts, two parallel paths from reference potential to $-V_s$ are completed. The first path is through transistor $Q_7$ and lamp 172 whereby the lamp illumination indicates that a multi-frequency signal tone has been received by the particular station. The second path is through transistor $Q_7$, resistor 138, diode $D_8$, and relay coil 168 whereby contacts 170 are closed to provide an appropriate signal to the corresponding station output device. Current through the second path also establishes a voltage across resistor 138 which is applied through current-limiting resistor 140 to place transistor $Q_9$ in a conducting condition. Since the output from pulse ratio detector 54 is connected to the base of transistor $Q_8$, this transistor is then placed in a conducting condition to provide an alternate bias path to the base of transistor $Q_7$ through resistor 136, transistors $Q_8$ and $Q_9$, diode $D_8$, and coil 168, and $SCR_1$ to maintain or lock transistor $Q_7$ in a conducting condition. $Q_7$ is thus insensitive to the changes of state of control pulse generator 62, as evidenced by the waveform at point 101, and $Q_7$ is thereafter maintained in a conducting condition until such a time when a legitimate signal is no longer being received and pulse ratio detector 54 switches from ON to OFF. At this time, transistor $Q_3$ turns on to reverse-bias diode $D_1$ and removes the locking signal from the base of transistor $Q_8$ to permit further operation of the frequency detection system.

It may thus be seen that the invention provides for highly selective frequency detection. The particular circuit elements described, especially those constituting frequency divider and pulse generator 52, pulse ratio detector 54, coincidence circuit 66, and reference pulse generator 68, provide for implementation of the method of operation discussed in conjunction with FIG. 2 by use of readily obtainable, inexpensive semiconductor devices which furnish reliable operation with a precision not heretofore obtainable with the use of filter devices.

Figure 6:
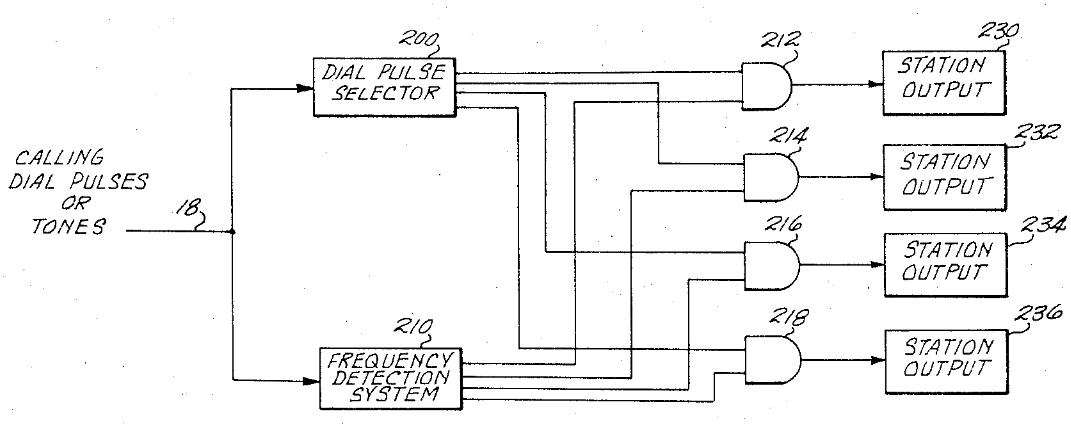
FIG. 6 is a block diagram of an application to telephone-associated intercoms.

Now turning to FIG. 6, a simple application of the frequency detection system of this invention to a telephone-associated intercom is illustrated. As discussed in the preamble, dial pulses or tones, single or multi-frequency, are applied to a common transmission line 18. Connected thereto is a dial pulse selector 200 and a frequency detection system 210. The dial pulse selector 200 may be that presently available as the Automatic Electric--70,--16KTU, or Bell System--207, of --216 units. Briefly, each of these units counts the number of pulses produced at any given time on transmission line 18 and converts this count into an appropriate output pulse of short duration by closing a pair of contacts in a corresponding output line. Four such output lines are illustrated in FIG. 6. Likewise, frequency detection system 210 comprises the elements illustrated in FIG. 2 and provides four separate outputs. The outputs of selector 200 and system 210 are applied to a plurality of nonexclusive OR gates 212, 214, 216 and 218 which are connected to four station output devices 230, 232, 234, and 236. The function of gates 212–218, which may comprise a simple relay coil and pair of contacts, to assure that any given station output device, such as device 230, may be actuated by either a calling telephone unit producing dial pulses or a calling telephone unit producing single or multi-frequency tones.

While the frequency detection system 210 is thus compatible with prior dial pulse systems, it has a number of advantages over such systems. For instance, there is no turn-down required of the frequency detection system constructed according to FIG. 2. The previous dial selector units require that an operator return the handset of a telephone unit to its cradle, and thus depress the associated hook switch, to accordingly reset the dial selector unit before another call on the intercom system can be made. Such a requirement virtually eliminates any possibility of using a telephone-associated intercom in a conference mode wherein three or more telephone units are interconnected in a single conversation. However, since the frequency detection system resets as soon as the calling tone is removed, a third party may be brought into the conversation simply by producing his calling frequency, without an accompanying break in the original conversation. Conversely, if desired, signaling of a party may continue as long as a single or multi-frequency tone is being produced by the calling telephone unit. The previous dial selector units have only provided for momentary actuation of their output contacts upon the reception of the correct number of pulses. Moreover, the provision of a signal tone output allows identification of the station being called by a distinctive, modulated audible tone.

Perhaps the most important advantage of this frequency detection system over the prior dial pulse systems, or the modifications of those systems by LC circuits which make them receptive to tone inputs, lies in the highly selective and varied signal detecting capability. Whereas the prior systems have only provided for combinations of approximately ten different signal tones, and thus severely restricted the calling combinations available unless a plurality of sequentiallyoccurring signals are combined, as in the common telephone number, the frequency detection system of the present invention provides for an almost unlimited number of single or multi-frequency calling tones, because of its ability to detect very slight differences in frequency.

The invention has found applicability in a multi-frequency receiver which provides two output signals from two station selectors and a single frequency detector and which is useful for teletype loop monitoring, telephone trunk line supervision, remote control, and party line station selection. As mentioned previously, the invention also finds applicability in supervisory systems providing monitoring and recording of telephone system operations, and in annunciator devices providing a distinct output in response to a plurality of separate alarm conditions. Another application in telephone systems is a test set for twin-tone systems wherein a digital readout is provided for each multi-frequency signal tone present on a transmission line. Finally, the frequency detector and station selector of this invention are applicable to signaling systems using single-frequency tones. In such a case, the embodiment illustrated in FIG. 2 is modified to provide a pulse input to the rectangular wave generator 50 whose frequency is related to that of the single-frequency tone.

Therefore, while this invention has been described in the context of a telephone-associated intercom, it is to be clearly understood by those skilled in the art that the invention is not limited thereto but rather has broad applicability to frequency detection systems. Accordingly, the scope of the invention should be measured only by the limits of the appended claims.

We claim:

1. Means to detect the presence of a sinusoidal signalling frequency on a transmission line having a plurality of frequencies thereon, including:

a. generator means producing a rectangular waveform from the signals on the transmission line, b. switching means having a first input terminal, a second input terminal, and an output terminal, said switching means producing a signal on said output terminal only when the signals presented to said first and second input terminals have equal magnitudes, c. a standard signal source connected to said second input terminal, and d. means connected to said generator means for integrating said rectangular waveform and supplying said integrated signal to said first input terminal, the time constant of said integrating means being chosen so that the magnitude of said integrated signal equals that of said standard signal only when said rectangular waveform has equal alternate pulse durations.

2. A detecting means as recited in claim 1, wherein said switching means comprises first and second transistors, each having a base, collector and emitter, the emitter of said second transistor being connected to the base of said first transistor, the emitter of said first transistor being connected to the base of said second transistor, and the collectors of said first and second transistors being connected to said output terminal, and wherein said integrating means is coupled to the base of said first transistor, and said standard signal source is coupled to the base of said second transistor.

3. A detecting means as recited in claim 2:

a. further comprising a biasing voltage source having reference and supply terminals, b. wherein:

1. said standard signal source comprises a voltage divider connected between said reference and said supply terminals, and
2. said integrating means comprises a resistor and capacitor connected in series between the rectangular waveform input and one of said reference or supply terminals, the common junction thereof being connected to said first input terminal of said switching means.

* * * * *